(12) United States Patent
Wohld

(10) Patent No.: US 8,965,447 B1
(45) Date of Patent: Feb. 24, 2015

(54) LOCATION BASED NETWORK SELECTION

(75) Inventor: Adam Harold Wohld, Saint Charles, IL (US)

(73) Assignee: Cellco Partnership, Basking Ridge, NJ (US)

( * ) Notice: Subject to any disclaimer, the term of this patent is extended or adjusted under 35 U.S.C. 154(b) by 422 days.

(21) Appl. No.: 12/862,372

(22) Filed: Aug. 24, 2010

(51) Int. Cl.
*H04B 7/00* (2006.01)
*H04W 4/00* (2009.01)

(52) U.S. Cl.
USPC .................. 455/525; 455/434; 455/435.2

(58) Field of Classification Search
USPC ............................ 455/435.3, 434, 525, 435.2
See application file for complete search history.

(56) References Cited

U.S. PATENT DOCUMENTS

| 5,235,633 | A | 8/1993 | Dennison et al. |
|---|---|---|---|
| 5,546,445 | A | 8/1996 | Dennison et al. |
| 6,324,404 | B1 | 11/2001 | Dennison et al. |
| 2007/0004404 | A1 * | 1/2007 | Buckley et al. ............... 455/434 |
| 2007/0275717 | A1 * | 11/2007 | Edge et al. .................... 455/434 |
| 2009/0005041 | A1 * | 1/2009 | Steinberg et al. .......... 455/435.2 |

* cited by examiner

*Primary Examiner* — Omoniyi Obayanju

(57) ABSTRACT

A mobile network system includes a number of mobile network base stations and a mobile station. The mobile station includes a mobile station antenna and a location determination device for identifying a geographic location of the mobile station. A mobile transceiver is also included and is configured to transmit and receive mobile communication signals from the mobile network base stations via the antenna. A microprocessor controls the transmission and reception of the mobile communication signals and communicates with the location determination device. Further, a spatial database identifies geographic positions related to the mobile networks. The microprocessor compares the geographical location of the mobile station with the geographic positions of the mobile networks to determine a preferred mobile network system.

21 Claims, 6 Drawing Sheets

LOCATION BASED NETWORK SELECTION

TECHNICAL FIELD

The present subject matter relates to techniques and equipment in the general art of cellular telephone or other mobile device technology, and to the particular field of managing the calls in an idle cellular system.

BACKGROUND

As mobile station users travel with their devices (e.g. mobile phones, mobile computers, and mobile broadband modems), a number of processes must take place to assure continuous service. One of the processes is idle handing off between mobile networks as users travel from region to region. The idle handoff process is important so the user has continuous service and stays on the correct system(s), as the user is being handed off from base station to base station. It can also cause problems for the mobile network provider if the handoff is performed improperly.

Currently, a list of System Identification Numbers "SID" and/or Network Identification Number ("NID") combinations and radio frequency ("RE") channels to scan are loaded into the mobile station. Once the mobile station is activated and is traveling, the RF channels are scanned until the appropriate SID/NID is found. The mobile station then registers on that mobile network.

To facilitate customer roaming where a particular operator may not have network coverage, the service provider or operator of one network will have agreements with other operators/service providers. Under such agreements, customers of the other operators may roam-in and use the one provider's network, whereas customers of the one provider may roam-out and use the networks of the other operators/service providers. However, different agreements among the parties may have different terms. As a result, some agreements may be more favorable, and a particular operator or service provider may 'prefer' for its customers to utilize the network of a particular other provider in certain areas. Hence, for a roaming subscriber, there is a financial benefit to the carrier selling service to the subscriber to implement procedures in the subscriber's mobile station to insure that the device selects the system in any area of operation that offers the best financial arrangement for services provided to the carrier's subscribers.

By way of a more specific example, the carrier may operate its network over a wide geographic area, and the carrier will have roaming agreements with operators of other networks in many other areas where subscribers roam. In some areas, the carrier may operate a network and have a roaming agreement with another carrier for instances in which a mobile station can not obtain access to the carrier's own network. In such a case, it is preferable for the subscriber's mobile station to select the carrier's network first, select the network of the roaming partner second and select any other available network only in the event that the first two network choices are inaccessible. In other areas, the carrier may have agreements with two operators of local networks. However, in such an area, one roaming agreement offers better rates, therefore the network of the preferred roaming partner should be selected whenever possible.

For the efficient acquisition of mobile communication networks, the carriers and their equipment vendors have developed and standardized a number of techniques for selecting systems in different areas for acquiring the network and obtaining service therefrom, in accordance with preferences of the subscriber's service provider/carrier. However, since the Third Generation Partnership Project 2 (3GPP2) and Third Generation Partnership Project (3GPP) standards bodies are working independently, the system selection procedures that they have established are different and use databases that are structured differently. 3GGP2 uses a Preferred Roaming List (PRL) that contains a table which identifies all of the operators that are roaming partners and which lists those partner operators in priority order. 3GPP uses Public Land Mobile Network (PLMN) lists to do the same.

Searching and acquiring a network, using a full PRL or PLMN search, however, takes considerable time and is typically done when a device is first turned-on or has lost all network service for some period of time. Each network listing in a typical preference list, e.g. in a PRL, might include a system ID (SID), a network ID (NID), a channel identification, and identification of a Radio Frequency Band, for each system and be classified by a geographic information index. The search may be time consuming, especially if a system has one or more configurable system parameters, and each such parameter can have one of multiple possible values. In this case, the station may perform acquisition for different possible combinations of values for the configurable system parameters in order to detect the system. Search and acquisition for a large number of possible combinations of parameter values from a long PRL or PLMN may extend search time and consume excessive battery power, both of which are undesirable.

For faster acquisition in other cases, for example, when the mobile device has been powered off briefly or in some cases when the device disconnects from one system while roaming, the device normally searches using a Most Recently Used (MRU) list having information of some much smaller number the most recently connected systems. The MRU list includes modes (CDMA, AMPS, EV-DO, etc.), band classes (Cellular, PCS, etc.) and channels of the most recently used systems. When an network is not found that matches a listing in the MRU list, the mobile device may turn to a more extensive search based on the PRL or PLMN. In this later case, if the device selects a new system, the device adds the system as a new entry in the MRU list for future use.

One of the disadvantages of these system selection techniques is that the mobile station may find a valid mobile network outside of the mobile network that the subscriber's carrier intends for the device to select for a user's current geographic coverage area. Mobile network providers are then required to configure the mobile network to redirect the mobile station while in idle mode. This redirection is not always practical and can reduce the capacity and/or the coverage of the existing mobile network.

For example, in a mobile network A, mobile stations are required to idle on channel 625 1900 MHz. However, in a mobile network B, bordering mobile network A, mobile stations can get on and idle on channel 384 850 MHz. This is not ideal since channel 384 850 MHz is used only in mobile network B and not mobile network A. Every channel 384 850 MHz from every antenna on every tower in mobile network B that transmits RF into mobile network A needs to have a parameter that redirects all mobile stations in order to make the mobile stations that acquire mobile network B channel 384 850 MHz reacquire mobile network A's channel 625 1900 MHz.

Alternately, a base station that needs to handle mobile calls on mobile network B channel 384 850 MHz and whose footprint extends into mobile network A, may not have a redirect parameter equipped. Thus, the coverage of the base station needs to be curtailed until it is not broadcasting into mobile network A. This may limit the call quality in the intended coverage area.

Mobile stations can idle on valid channels outside of the intended coverage area due to improper mobile network border configuration. This leads to the occurrence of dropped calls or failed call attempts. Service areas are limited to SID/NID broadcasts which are transmitted over RF. The service areas are actually geographically determined but controlled by RF. RF is inherently difficult to control. The granularity of the system is limited to a combination SID/NID/Channel selections.

In several prior patents, Dennison et al. (hereinafter "Dennison"), U.S. Pat. Nos. 5,235,633; 5,546,445; and 6,324,404, describe a solution to a similar problem. In Dennison, the mobile station determines its location using a process (e.g. a GPS built into the mobile station) to determine its exact geographic location (EGL). The mobile station then transmits its EGL up to the mobile network site. The EGL is compared to a database of the geographic boundaries prescribed for each mobile network site, the proper mobile network site for the particular user is determined, and the mobile network site informs the mobile station which mobile network site will handle a call.

Thus, the mobile network learns of the mobile station's location. Then the mobile network (e.g. a mobile telephone switching office or MTSO) tells the mobile station which mobile network site or channel to acquire. The downfall to this system is that it requires communication with, and processing by, the mobile network base station/mobile network switching office. This solution can tax the mobile network and the mobile network based systems with directing each of many mobile stations that needs to rectify its position. This solution also reduces the capacity of a cells site since the carrier can't be used partially for traffic and partially for redirection, it's either one or the other.

Hence, a need exists for a system that will allow mobile stations to properly place themselves on the proper mobile network base station or frequency (channel) without the need to acquire or communicate to a mobile network system.

SUMMARY

The teachings herein alleviate one or more of the above noted problems by providing a device and method to allow a mobile station to tune to the preferred mobile network system, regardless of the proximity of the mobile station to any mobile network system. As a result, the mobile network operators can be provided with a cost reduction and still provide the same or better level of service to their users.

A mobile network system includes a number of mobile network base stations and a mobile station. The mobile station includes a mobile station antenna and a location determination device for identifying a geographic location of the mobile station. A mobile transceiver is also included and is configured to transmit and receive mobile communication signals from the mobile network base stations via the antenna.

In the examples discussed in detail below, a microprocessor controls the transmission and reception of the mobile communication signals and communicates with the location determination device. Further, a spatial database identifies geographic positions related to the mobile network. The microprocessor compares a determined geographical location of the mobile station with the geographic positions of the mobile network to determine a preferred mobile network system with which to communicate.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level. without detail, in order to avoid unnecessarily obscuring aspects of the present teachings.

The various examples disclosed herein relate to performing one or more queries to determine what roaming mobile network the mobile station should acquire based on its geographic location.

Figure 1:
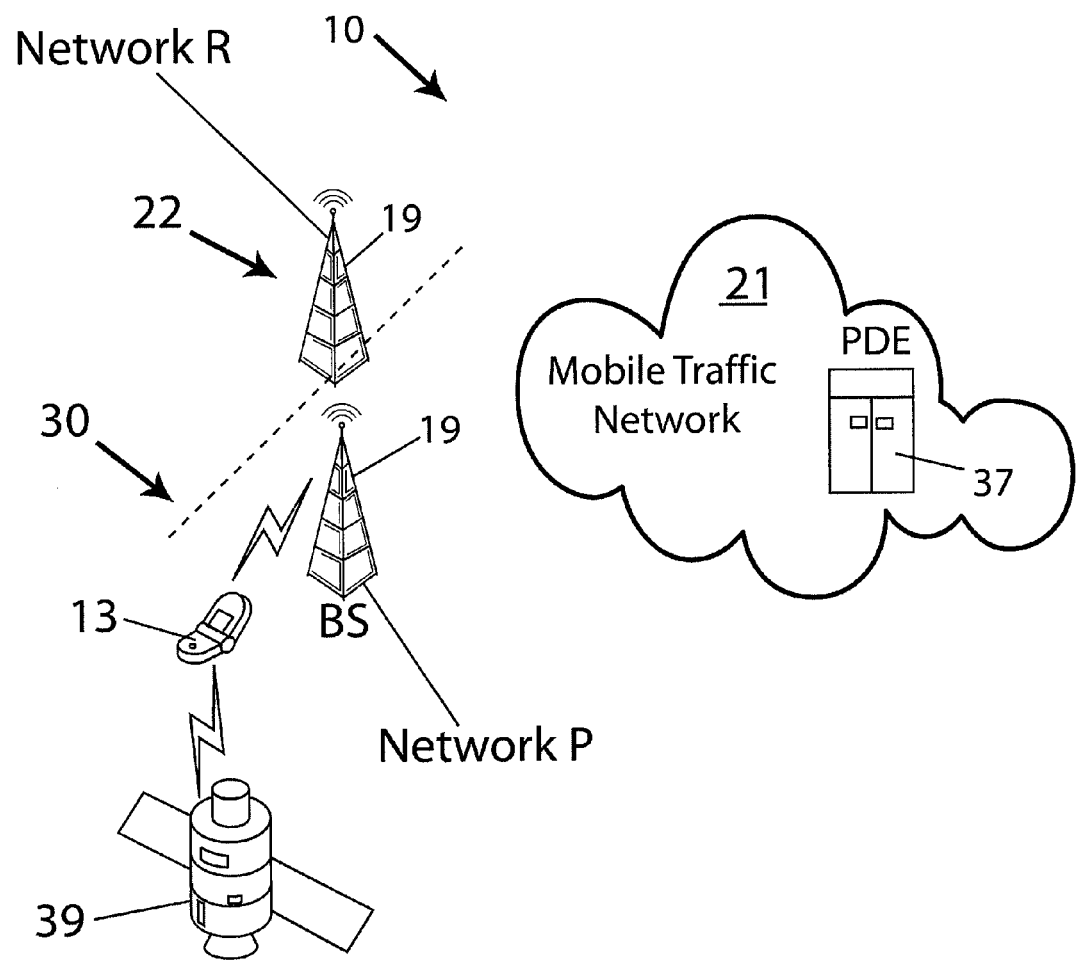
FIG. 1 is a functional block diagram that depicts various components of an exemplary mobile communications network.

Reference now is made in detail to the examples illustrated in the accompanying drawings and discussed below. FIG. 1 illustrates a mobile communication network 10 as may be operated by a carrier or service provider to provide a wide range of mobile communication services and ancillary services or features to its subscriber customers and associated mobile station (MS) users. The elements generally indicated by the reference numeral 10 generally are elements of the network and are operated by or on behalf of the carrier, although the mobile stations typically are sold to the carrier's customers. The mobile communication network 10 provides communications between mobile stations as well as communications for the mobile stations with networks and stations outside the mobile communication network 10.

The wireless mobile communication network 10 might be implemented as a network conforming to the code division multiple access (CDMA) IS-95 standard, the 3rd Generation Partnership Project 2 (3GPP2) wireless IP network standard or the Evolution Data Optimized (EVDO) standard, the Global System for Mobile (GSM) communication standard, a time division multiple access (TDMA) standard or other standards used for public mobile wireless communications. The mobile station 13 may be capable of conventional voice telephone communications and data communications. A variety of different types of mobile stations supporting such communications are widely available. Today, mobile stations typically take the form of portable handsets, smart-phones or personal digital assistants, although they may be implemented in other form factors.

The mobile communication network 10 typically is implemented by a number of interconnected networks. Hence, the overall network 10 may include a number of radio access networks (RANs), as well as regional ground networks interconnecting a number of RANs and a wide area network (WAN) interconnecting the regional ground networks to core network elements. A regional portion of the network 10, such as that serving mobile station 13 will typically include one or more RANs and a regional circuit and/or packet switched network and associated signaling network facilities.

Physical elements of a RAN operated by one of the mobile service providers or carriers, include a number of base stations represented in the example by the base stations (BS) 19. Although not separately shown, such a base station 19 typically comprises a base transceiver system (BTS) which communicates via an antennae system at the site of base station and over the airlink with one or more of the mobile stations 13, when the mobile stations are within range. Each base station typically includes a BTS coupled to several antennae mounted on a radio tower within a coverage area often referred to as a "cell." The BTS is the part of the radio network that sends and receives radio frequency ("RF") signals to/from the mobile station 13 that the base station 19 currently serves.

Boundary line 30 illustrates a division between different mobile network provider's mobile networks. There are typically very similar physical elements in the differently owned mobile networks. The boundary line 30 can also divide a network owned by the same company but have disjointed frequencies. For example, Verizon Wireless uses a frequency of 1900 MHz in Wisconsin and a frequency of 850 MHz in Illinois. Additionally, network R includes base station 25, similar to base station 19 described above.

In addition, the radio access networks also include a traffic network represented generally by the cloud at 21, which carries the user communications for the mobile stations 13 between the base stations and other elements with or through which the mobile stations communicate. In some examples, the mobile traffic network 21 includes a position determining entity (PDE) 37.

Each mobile station 13 can make a geographic location determination, in which the mobile station 13 takes measurements of signals from a number of GPS satellites 39 and processes those measurements so as to determine the latitude and longitude (and possibly altitude) of the current location of the mobile station 13.

Note that in examples, the mobile station 13 does not need to communicate with a PDE 37 or any other element of the network 10 to make the proper determination. Thus, in an example, the mobile station 13 does not connect to the mobile communication network 10 to determine the preferred mobile network system.

In other examples, the PDE 37 functions as a network element that manages the position or geographic location determination of each mobile station 13. The exemplary network 10 utilizes an assisted GPS approach to the determination of mobile station location, in which the mobile station 13 takes measurements of signals from a number of GPS satellites 39 and interacts with the PDE 37 to process those measurements so as to determine the latitude and longitude (and possibly altitude) of the current location of the mobile station 13.

Figure 2:
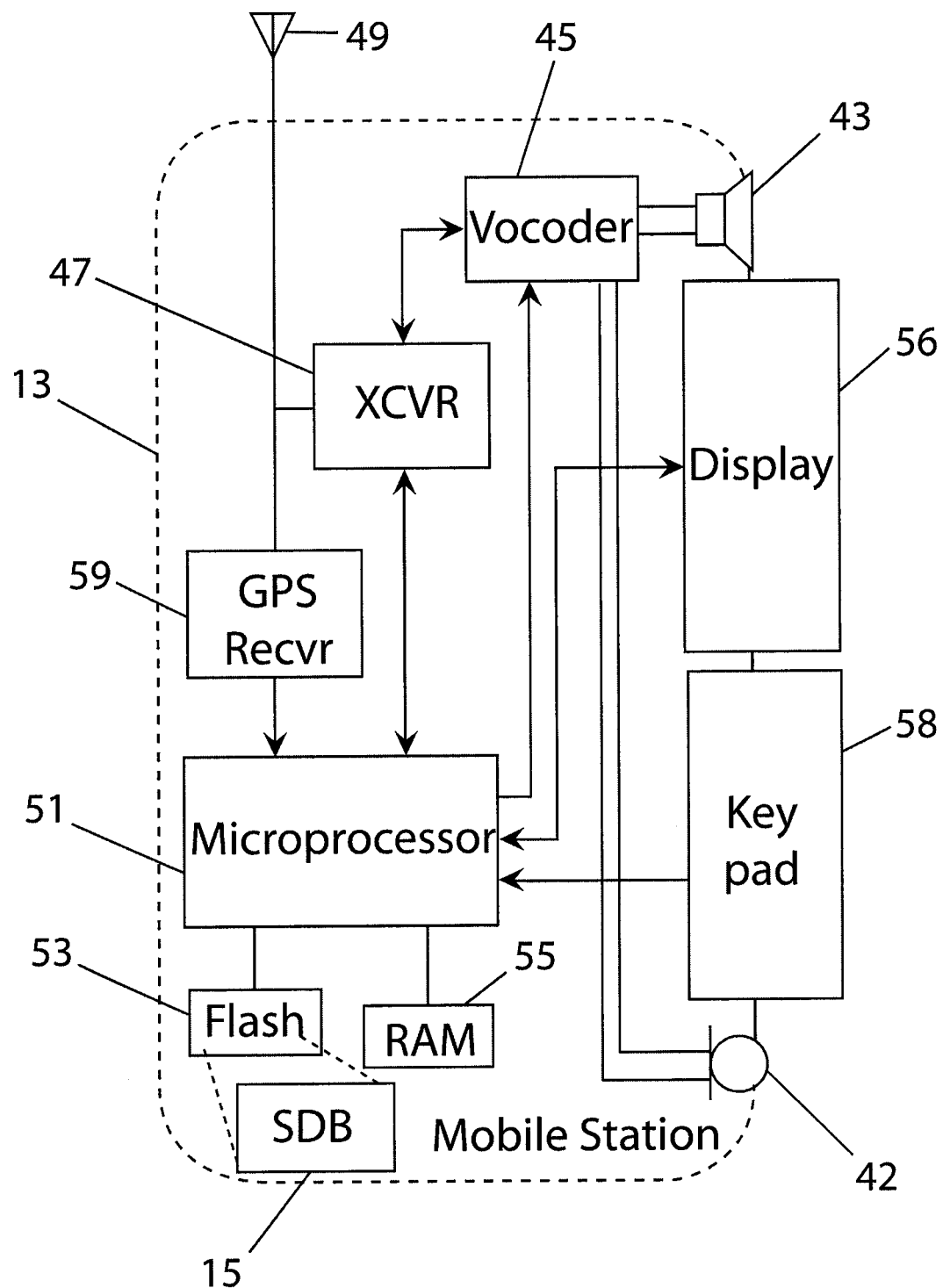
FIG. 2 is a simplified functional block diagram of a mobile station.

With reference to FIG. 2 a block diagram illustrating a GPS enabled mobile station 13 is shown and described. Although the station 13 may be incorporated into a vehicle mounted mobile unit or into another device, such as a portable personal computer or PDA, for discussion purposes the illustration shows the station 13 in the form of a handset. The handset embodiment of the mobile station 13 functions as a digital wireless telephone station. For that function, the station 13 includes a microphone 42 for audio signal input and a speaker 43 for audio signal output. The microphone 42 and speaker 43 connect to voice coding and decoding circuitry (vocoder) 45. For a voice telephone call, for example, the vocoder 45 provides two-way conversion between analog audio signals representing speech or other audio and digital samples at a compressed bit rate compatible with the digital protocol of wireless telephone network communications or voice over packet (Internet Protocol) communications.

For digital wireless communications, the mobile station 13 also includes a digital transceiver (XCVR) 47. The concepts discussed here encompass embodiments of the station 13 utilizing any digital transceivers that conform to current or future developed digital wireless communication standards. For example, the transceiver 47 could be a TDMA or GSM unit designed for cellular or PCS operation. In the present embodiments, the digital transceiver 47 is a CDMA transceiver compatible with operation via an IS-95 network or a 1x network, to provide both voice and packet data communications. Also, the mobile station 13 may utilize either or both of 3GPP2 (1XRTT and EVDO) technologies and 3GPP (LTE/GSM/UMTS) technologies. In other Multimode transceivers also may be used.

The transceiver 47 provides two-way wireless communication of information, such as vocoded speech samples and/or digital message information. The transceiver 47 also sends and receives a variety of signaling messages in support of the various services provided via the station 13 and the network 10. Communications via the transceiver 47 and the antenna 49 may include various messages related acquisition assistance, position determination and related location based services. The transceiver 47 connects through RF send and receive amplifiers (not separately shown) to an antenna 49. In the example, the transceiver 47 is configured for RF communication in accord with a digital wireless protocol. The mobile station 13 may include one or more additional transceivers, for example, for operation in an analog mode or in accord with an alternative digital standard.

A microprocessor 51 serves as the programmable controller in that it controls all operations of the mobile station 13 in accord with programming that it executes. The mobile station 13 also includes flash type program memory 53 and/or a non-volatile random access memory (RAM) 55, for storing various software routines and mobile configuration settings, such as mobile identification number (MIN), etc. In a present implementation, the flash type program memory 55 stores an operating system, device driver software, call processing software and vocoder control software; and the memory may store any of a wide variety of other applications, such as client browser software and short message service software.

As shown, the mobile station 13 includes a display 56 for displaying messages, menus or the like, call related information dialed by the user, calling party numbers, etc. A keypad 58 enables dialing digits for voice and/or data calls and generating selection inputs keyed by the user based on any displayed menu. The display 56 and keypad 58 are the physical elements providing a textual or graphical user interface. In addition to normal telephone related input/output, these elements are also used for display of menus and other information to the user and user input of selections and for any other applications relating to determining position and providing ancillary position specific information. Of course other user interface elements may be used, such as a stylus and touch sensitive display screen, as in a PDA or mobile smartphone.

For position determination and associated location based services, the mobile station 13 also includes a location determination device 59, which for this example can be a GPS receiver 59. Under control of the microprocessor 51, the GPS receiver 59 receives and processes signals from one or more satellites of the constellation of GPS satellites 39. From its processing, the GPS receiver 59 supplies GPS data to the microprocessor 51, such as pseudorange measurements and associated PN codes for measured satellite signals. Associated computations may be performed in the microprocessor or by a processor or the like included in the GPS receiver 59.

As noted above, some examples do not require the mobile station 13 to connect to the network 10 before trying to acquire a signal/band frequency.

If the receiver 59 or the combination of the receiver and the microprocessor 51 are configured to provide a fully functional GPS position determination device, the station 13 could process the pseudorange measurements, absolute times of transmission of the GPS signals, and the satellite position data to compute the mobile station's latitude and longitude.

In other examples, because of size/space/cost constraints on the design of the mobile stations 13, the GPS receiver 59 in the mobile station 13 often will have only reception capability, not the full GPS processing capability to resolve position from signals received from the satellites 39. Hence, the receiver 59 supplies the GPS measurement and code data to the microprocessor 51, which in turn formats the data and sends it to the PDE 37 using the wireless transceiver 47. The PDE 37 performs the data processing necessary to determine the latitude and longitude of the station 13 and transmits that data where needed, which in some cases will be back to the mobile station 13 for further processing.

Additionally, there are other telemetric procedures that can determine the location of a radio frequency emitting and receiving device. The location determination device 59 can also use LORAN, Wireless Assisted GPS, Time Difference of Arrival (TDOA), Angle of Arrival (AOA), and any other device or method to determine the location of a radio frequency emitting and receiving device known to those of ordinary skill in the art.

In a typical mobile network when the mobile station 13 is located within the network provider's preferred mobile network ("network P") the user's mobile station 13 typically determines which mobile network system to use based on the strength of the signal 22 emanating from each particular mobile network station 19, 25. However, at the boundaries between different mobile network provider mobile networks, when the mobile station 13 crosses the boundary 30, the hand-off into or acquisition of the "roaming" mobile network ("network R") may not happen without interference with the mobile station's service. The present invention uses existing mobile station technology in a novel way to smoothly transition a user to and from a roaming mobile network.

Figure 3:
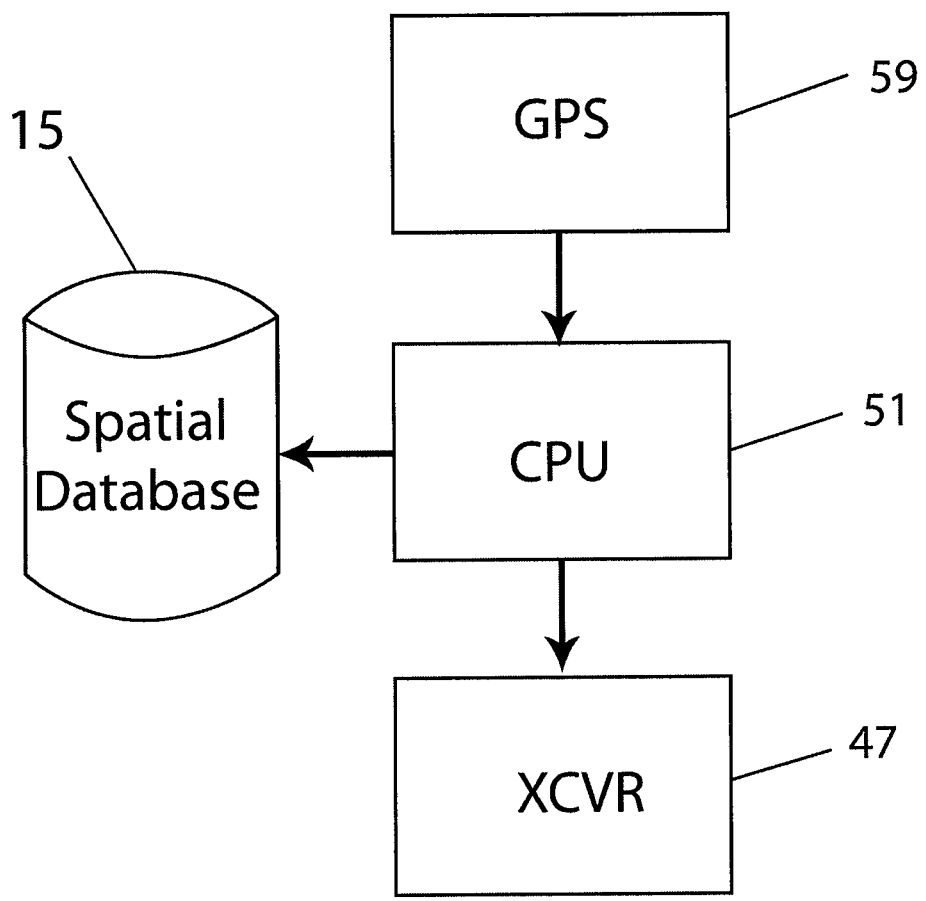
FIG. 3 is a simplified functional block diagram of the GPS, Microprocessor, Transceiver, Spatial Database combination.

FIGS. 2 and 3 illustrate a spatial database 15. The spatial database 15 can be loaded onto memory 53, 55, or a standalone memory device that can be permanent to the mobile station 13, or removable. The spatial database 15 can be pre-loaded in RAM 55 or loaded in flash 53, which can allow it to be updated. The spatial database 15 contains a listing of the mobile networks P, R, their corresponding RFs, and channels, and individual geographic positions. Additionally, the spatial database can include all of the information above but for the base stations 19, 25.

The "geographic location" or "geographic position" of the either the mobile station 13, the base stations 19, 25 or the mobile network P, R, can be represented as latitude and longitude, and/or altitude, other coordinates in any space or plane, or a single digit, or series of digits that are calculated based location. For example, a service area for network P can be defined as a point or a series of points along the boundary line 30 or points within a boundary area formed by boundary line 30. Alternately, each base station 19 can be identified. A single geographic location can also be used and can be the location of a center or a centroid of the mobile network boundary or the base station boundaries. The conversion of telemetric data to a geographic location is known in the art, and the present invention contemplates all known methods to resolve a geographic location or position of an object.

Figure 4:
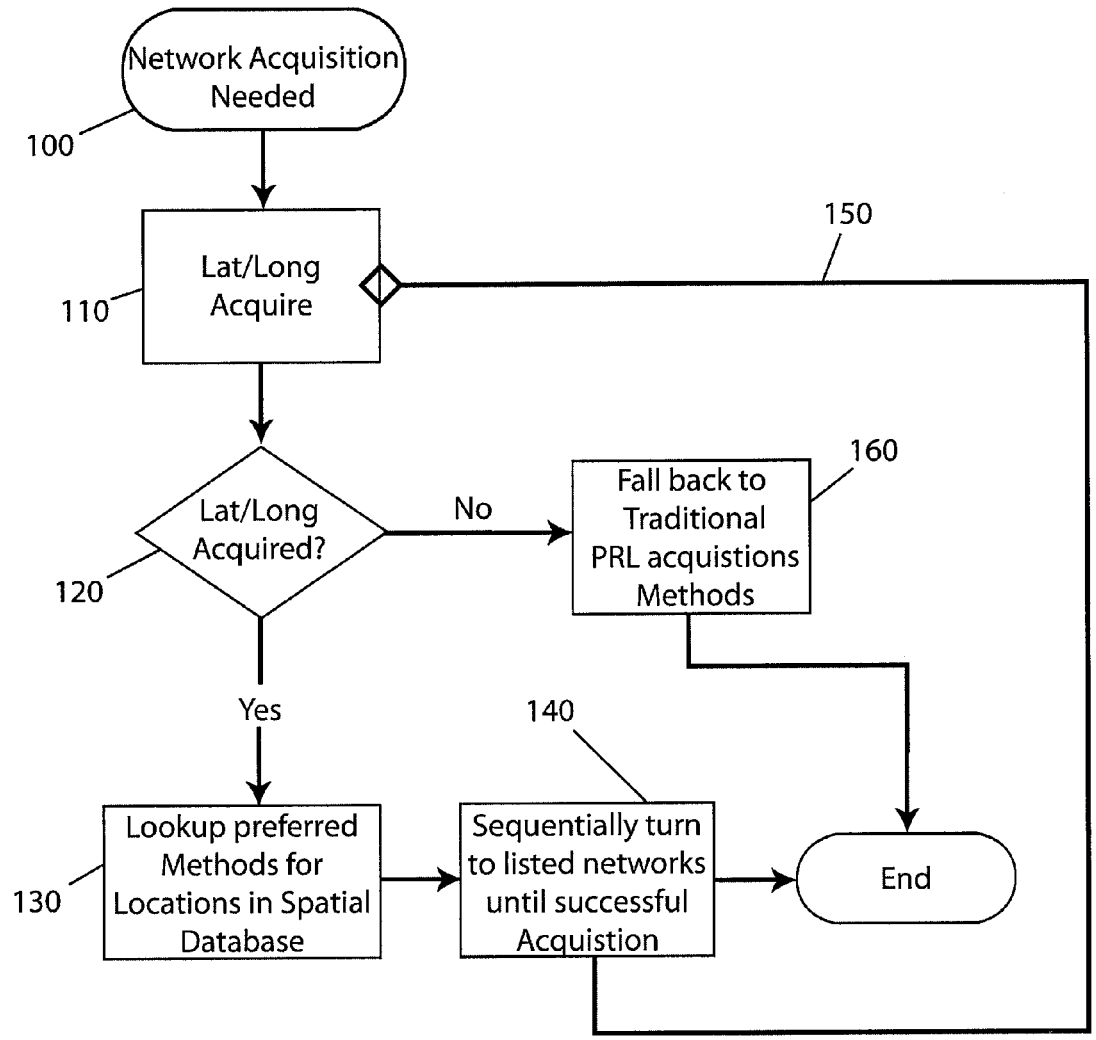
FIG. 4 is a flow chart outlining exemplary steps for determining the preferred network.

FIG. 4 illustrates a flow chart of an example of the process by which the present invention performs network acquisition. While a user is traveling, the mobile station 13 determines that a new mobile network should be acquired (step 100). This determination can be based on the standard determination known in the art, a low RF signal reception, a set time interval, the determination that the position of the mobile station 13 is changing a particular amount over a particular time, or by signaling from the mobile network that the mobile device is in a border area. The microprocessor 51 then acquires from the GPS receiver 59 a geographic location, which in this example is a latitude and longitude (step 110). The acquisition of the geographic location can be done by accessing a last known geographic location stored in memory 53, taken within a certain time window of the request for the new acquisition, or the microprocessor 51 can request the GPS receiver 59 to take a new measurement. The microprocessor 51 then determines if the geographic location has been acquired (step 120). This determination can be based on whether or not the GPS receiver 59 can calculate a current geographic location, based on signal reception or number of GPS satellites 39 needed to complete a calculation. Additionally, it can be based on whether or not there is a recent geographic location stored that can be used.

Once the microprocessor 51 acquires the geographic location (lat/long) it accesses the spatial database 15 and looks for a preferred network (step 130). A typical query compares the geographic location of the mobile station 13, with the geographic positions of the preferred network, the geographic positions of the base stations 19 within the preferred network, or the geographical areas or regions that define the preferred network. The comparison can match geographic locations with geographic positions, or there can be an algorithm that computes the closest two geographic locations and positions without an exact match. Once the matching geographic locations and positions are determined, the spatial database 15 provides to the processor the information required for the mobile station 13 to tune to the preferred network P (step 140).

There may be multiple preferred networks that are matched in the previous step. If so, an algorithm can be designed to rank the preferred networks. The microprocessor 51 can then take the top ranked preferred network and provide instructions to tune to that network. If the top ranked network is unavailable, based on signal strength, the microprocessor 51 can go sequentially down a list of the ranked preferred networks until a preferred network can be successfully tuned.

In an alternate example, when the top ranked preferred network cannot be acquired, the microprocessor 51 can restart the process (step 150). This example can be used if the mobile station 13 is moving quickly, thus its geographic location is changing quickly, which can affect the outcome of the previous rankings.

Further, if the acquisition of the geographic location (in step 120) fails, either because of insufficient signal to the GPS receiver 59 or an aged previously determined geographic location, the microprocessor 51 then defaults to the prior art method of acquiring a new network (step 160). As noted above, the conventional method entails the mobile station 13 having a list of preloaded SID/NID and radio frequency ("RF") channels to scan. Once the mobile station is activated and is traveling, the RF channels are scanned until the appropriate SID/NID is found. The mobile station then registers on that mobile network. However, the mobile station may find a valid mobile network outside of the mobile network that is intended for that geographic coverage area.

In another example, the identifying, retrieving, comparing, and determining steps (steps 100-130) outlined above are all performed on the mobile station without communicating with the mobile network.

Figure 5:
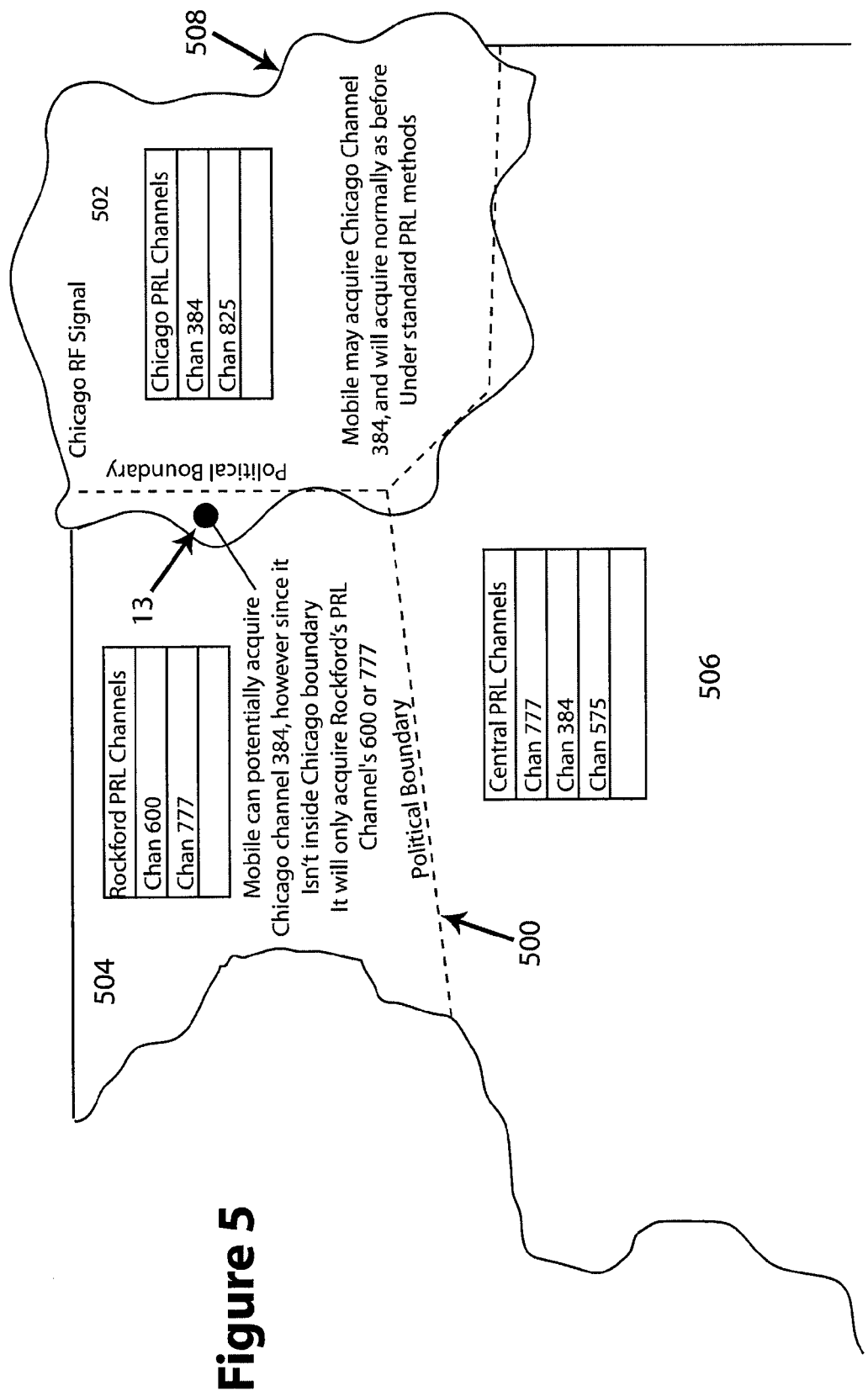
FIG. 5 is a simplified map showing multiple mobile networks and overlaid RF coverage.

FIG. 5. illustrates the north-east corner of Illinois as an example of why the invention is necessary in real world conditions. Political boundary 500 divides northern Illinois into multiple territories, Chicago 502, Rockford 504, and Central 506. Chicago's RF signal 508 is represented by the dark hatching. As can be seen, the Chicago RF signal 508 extends over boundary 500 into both Rockford 502 and Central 506. The mobile station 13 is located in Rockford 502 and, if searching for a network, should acquire the Rockford network. However, since the mobile station 13 is located within the range of the Chicago RF signal 508, there is a high probability that it will improperly acquire the Chicago network. With the present invention, the mobile station 13 determines its geographic location, and by using the spatial database 15, can be instructed to only search for the Rockford network, ignoring the Chicago RF signal 508.

Political boundary 500 can also be considered a geographical region 500 in which the mobile station 13 stores the boundaries of the areas where the Chicago RF signal 508 in the controlling frequency in that area.

As shown by the above discussion, functions relating to selection of the preferred network system by a mobile station to may be implemented in the form of programming and associated list data for controlling operations of the mobile station device. An example of the device has been discussed above relative to FIG. 2. The relevant software (programming and/or list data) may be downloaded and/or updated from a computer platform, for example, from an OTAF (Over-The-Air service activation/provisioning Function) server, or the like, communicating with the mobile station via the mobile network. Although special purpose devices may be used to support the download and update functions, such devices also may be implemented using one or more general purpose hardware platforms running appropriate programming. A host or other general purpose data processing device configured to perform as the OTAF might run "server" programming for the programming and list download functions, whereas the mobile station might run appropriate "client" programming for the complementary functions. Of course, the mobile station runs the programming to implement the preferred network determination functions, as discussed above, as well as to implement system selection and other location related features of the device.

As known in the data processing and communications arts, a general-purpose computer typically comprises a central processor or other processing device, an internal communication bus, various types of memory or storage media (RAM, ROM, EEPROM, cache memory, disk drives etc.) for code and data storage, and one or more network interface cards or ports for communication purposes. The software functionalities involve programming, including executable code as well as associated stored data, e.g. files used for the various country determination and technology detection lists. The programming code is executable by the microprocessor 51 of the mobile station, e.g. from storage in the flash memory 53. For downloading and installation, however, the software is stored within the general-purpose computer platform or the like serving as the OTAF system.

Figure 6:
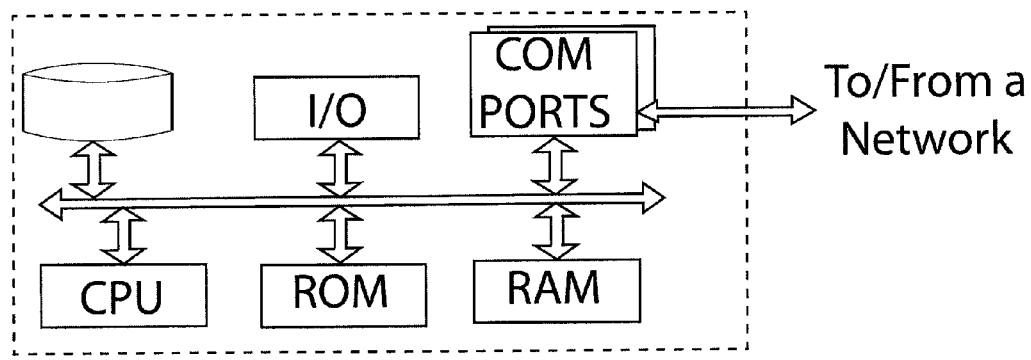
FIG. 6 is simplified functional block diagram of a computer that may be configured as a host or server.
Figure 7:
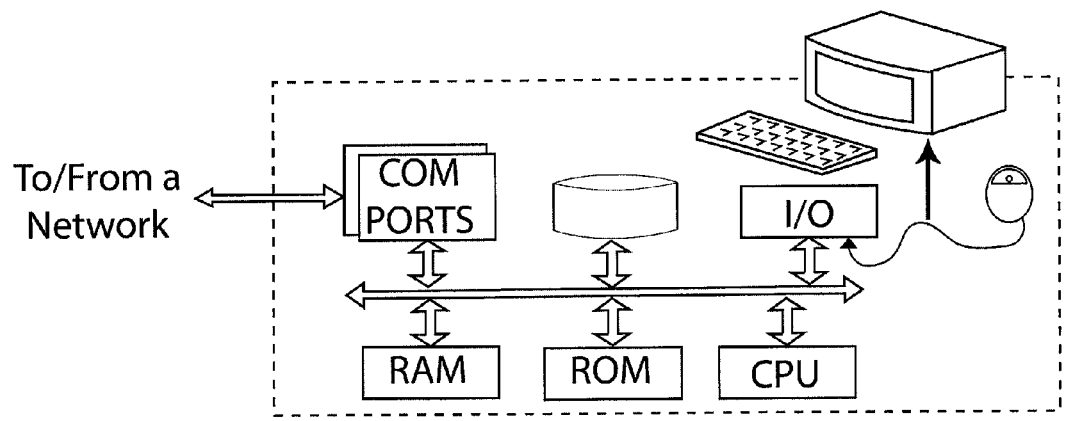
FIG. 7 is a simplified functional block diagram of a personal computer or other work station or terminal device

FIGS. 6 and 7 provide functional block diagram illustrations of general purpose computer hardware platforms. FIG. 6 illustrates a network or host computer platform, as may typically be used to implement a server. FIG. 7 depicts a computer with user interface elements, as may be used to implement a personal computer or other type of work station or terminal device, although the computer of FIG. 7 may also act as a server if appropriately programmed. It is believed that those skilled in the art are familiar with the structure, programming and general operation of such computer equipment and as a result the drawings should be self-explanatory.

A server, for example, includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature, and it is presumed that those skilled in the art are adequately familiar therewith. Of course, the server functions may be implemented in a distributed fashion on a number of similar platforms, to distribute the processing load.

Hence, aspects of the methods of mobile network selection outlined above may be embodied in programming. Program aspects of the technology may be thought of as "products" or "articles of manufacture" typically in the form of executable code and/or associated list data that is carried on or embodied in a type of machine readable medium. "Storage" type media include any or all of the memory of the computers, processors or the like, or associated modules thereof, such as various semiconductor memories, tape drives, disk drives and the like, which may provide storage at any time for the software programming. All or portions of the software may at times be communicated through the Internet or various other telecommunication networks. Such communications, for example, may enable loading of the software programming from a computer or processor into the mobile station, for example, from the OTAF server or other computer of the mobile network operator into the mobile station(s) of the operator's customer(s). Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or a physical transmission medium. Non-volatile storage media include, for example, optical or magnetic disks, such as any of the storage devices in any computer(s) or the like, such as may be used to implement the information flow control, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions and/or associated list data to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A mobile station for communication through a mobile network system adjacent to a preferred mobile network system and separated from the preferred mobile network system by a geo-political boundary, the mobile station comprising:
    a location determination device for obtaining data indicative of a geographic location of the mobile station;
    a mobile station antenna electrically linked to the location determination device;
    a mobile transceiver electrically linked to the antenna, the mobile transceiver configured to transmit and receive mobile communication signals to and from the mobile network system via the antenna;
    a microprocessor electronically linked to the mobile transceiver to control the transmission and reception of the mobile communication signals and communicating with the location determination device;
    a spatial database electronically linked to the processor, and storing data identifying at least one or more geographic positions related to one or more mobile network systems,
    wherein the microprocessor is configured to:
        establish using the mobile transceiver a connection to a first mobile network system, the first mobile network system having a position determining entity (PDE);
        generate and send via the established connection a message to the PDE including the data obtained from the location determination device indicative of the geographic location of the mobile station;
        receive a response message from the PDE including a geographic coordinate for the geographic location of the mobile station, in response to the sending of the message to the PDE including the data indicative of the geographic location of the mobile station;
        retrieve, from the spatial database, data identifying, based on the geographical coordinate included in the response message from the PDE, a subset of the one or more geographic positions of the one or more mobile network systems;
        compare the geographic coordinate for the geographic location of the mobile station identified in the response message to the data identifying the subset of the one or more geographic positions of the one or more mobile network systems to determine the preferred mobile network system; and
        control the mobile transceiver to establish a connection to the preferred mobile network system determined based on the geographic coordinate received in the response message from the PDE and the geographic positions in the spatial database, selection of the preferred mobile network system based only on the geographic coordinate and the one or more geographic positions such that network conditions that might otherwise cause the mobile station to select the adjacent mobile network system are disregarded and a connection to the preferred mobile network system, rather than the adjacent mobile network system, is established, and
    wherein a geographic coordinate for each position of a mobile network system identifies a coordinate for the center of an intended service area of the respective mobile network system.

2. The mobile station of claim 1, wherein the mobile transceiver is configured to be tuned to a RF signal based on the preferred mobile network system.

3. The mobile station of claim 1, wherein the location determination device is a Global Positioning System (GPS).

4. The mobile station of claim 1, wherein each entry in the spatial database identifying one of the plurality of geographic positions of the mobile network systems includes a series of geographical coordinates defining a boundary.

5. A method for location based roaming of a mobile station in a mobile network system,
    wherein a mobile network system is adjacent to a preferred mobile network system and separated from the preferred mobile network system by a geo-political boundary, and the mobile station stores a spatial database containing data identifying a plurality of geographic positions associated with a plurality of mobile network systems,
    the method comprising the steps of:
    establishing a connection to a first mobile network system using a mobile station transceiver in the mobile station, the first mobile network system having a position determining entity (PDE);
    acquiring data indicative of a geographic location of a mobile station using a location determination device in the mobile station;
    generating and sending via the established connection a message to the PDE including the data indicative of the geographic location of the mobile station;
    receiving a response message from the PDE including a geographic coordinate for the geographic location mobile of the mobile station, in response to the sending of the message to the PDE including the data indicative of the geographic location of the mobile station;

retrieving, from the spatial database, data identifying, based on the geographical coordinate included in the response message from the PDE, a subset of the plurality of geographic positions of the mobile network systems;

comparing, with a microprocessor located in the mobile station, the geographic coordinate received from the PDE for the geographic location of the mobile station to the data identifying the subset of the plurality of geographic positions of the mobile network systems;

determining a preferred mobile network system, from the plurality of mobile network systems, based on the comparison step;

tuning the mobile station transceiver to establish a connection to and communicate with the preferred mobile network system; and in controlling the mobile transceiver, basing selection of the preferred mobile network system only on the geographic coordinate and the geographic positions such that network conditions that might otherwise cause the mobile station to select the adjacent mobile network system are disregarded and a connection to the preferred mobile network system, rather than the adjacent mobile network system, is established.

6. The method for location based roaming in a mobile network of claim 5, wherein the determining step further comprises the steps of:

determining additional preferred mobile network systems, from the plurality of mobile network systems; and compiling a list which includes the preferred mobile network system and the additional preferred mobile network systems, wherein the tuning step further comprises the step of sequentially tuning the mobile station transceiver, in an order provided from the compiled list, until one of the preferred mobile network systems is acquired.

7. An article of manufacture, comprising:

a non-transitory machine readable storage medium; and instructions, embodied in the machine readable storage medium, for causing a mobile station communicating through a mobile network system, wherein the mobile network system is adjacent to a preferred mobile network system and separated from the preferred mobile network system by a geo-political boundary, and storing a spatial database containing data identifying a plurality of geographic positions associated with a plurality of mobile network systems to implement functions including function to:

establish a connection to a first mobile network system using a mobile station transceiver in the mobile station, the first mobile network system having a position determining entity (PDE);

acquire data indicative of a geographic location of a mobile station using a location determination device in the mobile station;

generate and send via the established connection a message to the PDE including the data indicative of the geographic location of the mobile station;

receive a response message from the PDE including a geographic coordinate for the geographic location of the mobile station, in response to the sending of the message to the PDE including the data indicative of the geographic location of the mobile station;

retrieve, from the spatial database, based on the geographical coordinate included in the response message from the PDE, data identifying a subset of the plurality of geographic positions of the mobile network systems;

compare, with a microprocessor located in the mobile station, the geographic coordinate received from the PDE for the geographic location of the mobile station to data identifying the subset of the plurality of geographic positions of the mobile network systems;

determine the preferred mobile network system, from the plurality of mobile network systems, based on the comparison function;

tune the mobile station transceiver to establish a connection to and communicate with the preferred mobile network system; and in controlling the mobile transceiver, base selection of the preferred mobile network system only on the geographic coordinate and the geographic positions such that network conditions that might otherwise cause the mobile station to select the adjacent mobile network system are disregarded and a connection to the preferred mobile network system, rather than the adjacent mobile network system, is established.

8. The mobile station of claim 1, wherein the preferred mobile network system is different from the first mobile network system.

9. The method of claim 5, wherein the determined preferred mobile network system is different from the first mobile network system.

10. The mobile station of claim 1, wherein the data obtained from the location determination device includes measurements of signals received from satellites and indicative of the geographic location of the mobile station.

11. The method of claim 5, wherein the acquiring data indicative of a geographic location of a mobile station comprises receiving signals from satellites and indicative of the geographic location of the mobile station.

12. The mobile station of claim 1, wherein:

the spatial database stores data identifying, for each respective one of the one or more mobile network systems, at least one radio frequency and channel associated with the respective one mobile network system; and the controlling the mobile transceiver comprises controlling the mobile transceiver to tune to the at least one radio frequency and channel associated with the preferred mobile network system in the spatial database.

13. The method of claim 5, wherein:

the spatial database stores data identifying, for each respective one of the plurality of mobile network systems, at least one radio frequency and channel associated with the respective one mobile network system; and the tuning the mobile station transceiver comprises tuning the mobile station transceiver to the at least one radio frequency and channel associated with the preferred mobile network system in the spatial database.

14. The mobile station of claim 1, wherein each entry in the spatial database identifying one of the one or more geographic positions of the at least one or more mobile network systems includes a series of geographical coordinates for each base station of the mobile network system associated with the entry.

15. The method of claim 5, wherein each entry in the spatial database includes a series of geographical coordinates for each base station of the mobile network system associated with the entry.

16. The mobile station of claim 1, wherein the microprocessor generates and sends the message to the PDE in response to receiving a signal from the first mobile network system that the mobile station is in a border area.

17. The mobile station of claim 16,
wherein the border area is a boundary area between service areas of different mobile network systems, and
wherein the different mobile network systems operate on different frequencies in the respective service areas.

18. The mobile station of claim 16,
wherein the border area is a boundary area between service areas of different mobile network systems, and
wherein the different mobile network systems direct mobile stations being served to idle on different channels.

19. The method of claim 5, wherein the microprocessor acquires the data indicative of a geographic location in response to receiving a signal from the first mobile network system that the mobile station is in a border area.

20. The mobile station of claim 1, wherein:
when the microprocessor compares the geographic coordinate with the one or more geographic positions in the spatial database, the microprocessor determines multiple mobile network systems, and
the microprocessor is further configured to:
rank the multiple mobile network systems; and
sequentially tune the mobile station transceiver, in an order provided from the ranked multiple mobile network systems, until one of the multiple mobile network systems is acquired.

21. The method of claim 5, wherein each entry in the spatial database identifying one of the plurality of geographic positions of a mobile network system includes a series of geographical coordinates defining a boundary.

\* \* \* \* \*